United States Patent [19]

Roberts

[11] Patent Number: 4,735,636

[45] Date of Patent: Apr. 5, 1988

[54] NUCLEATION SEPARATOR FOR FLUE GAS

[75] Inventor: Donald L. Roberts, Escondido, Calif.

[73] Assignee: Energy Conversion Corporation, Escondido, Calif.

[21] Appl. No.: 933,371

[22] Filed: Nov. 21, 1986

[51] Int. Cl.⁴ .............................................. B01D 53/14
[52] U.S. Cl. .................................... 55/80; 55/84;
55/93; 55/20; 55/21; 55/222; 55/257 R
[58] Field of Search ....................... 55/19–21,
55/93, 94, 217, 2 B, 53, 80, 84, 467, 222, 257 R

[56] References Cited

U.S. PATENT DOCUMENTS

| | | | |
|---|---|---|---|
| 3,431,707 | 3/1969 | Borg | 55/20 |
| 3,435,593 | 4/1969 | Nordone | 55/84 |
| 3,518,812 | 7/1970 | Kolm | 55/20 |
| 3,704,570 | 12/1972 | Mordenier | 55/84 |
| 4,049,399 | 9/1977 | Teller | 55/94 X |
| 4,078,390 | 3/1978 | Duvall | 55/84 X |
| 4,435,192 | 3/1984 | Stewart | 55/19 |
| 4,544,380 | 10/1985 | Itou et al. | 55/93 X |

Primary Examiner—Charles Hart

[57] ABSTRACT

Processes and apparatus are disclosed for the separation and collection of contaminants from combustion chamber flue gas by means of heterogeneous nucleation and droplet accretion. The embodiment of the invention is based on: (1) A means of saturating the flue gas proportional to the contaminant volume. (2) A conception of a nucleation chamber where cold gas is added to establish and maintain a continuous supersaturated state throughout its volume. (3) A cold heat exchanger which lowers the partial pressure of the nucleation chamber and assists in maintaining a state of supersaturation. (4) A turbulent and inertial means of collecting the large drops together with the contaminant particles.

4 Claims, 1 Drawing Sheet

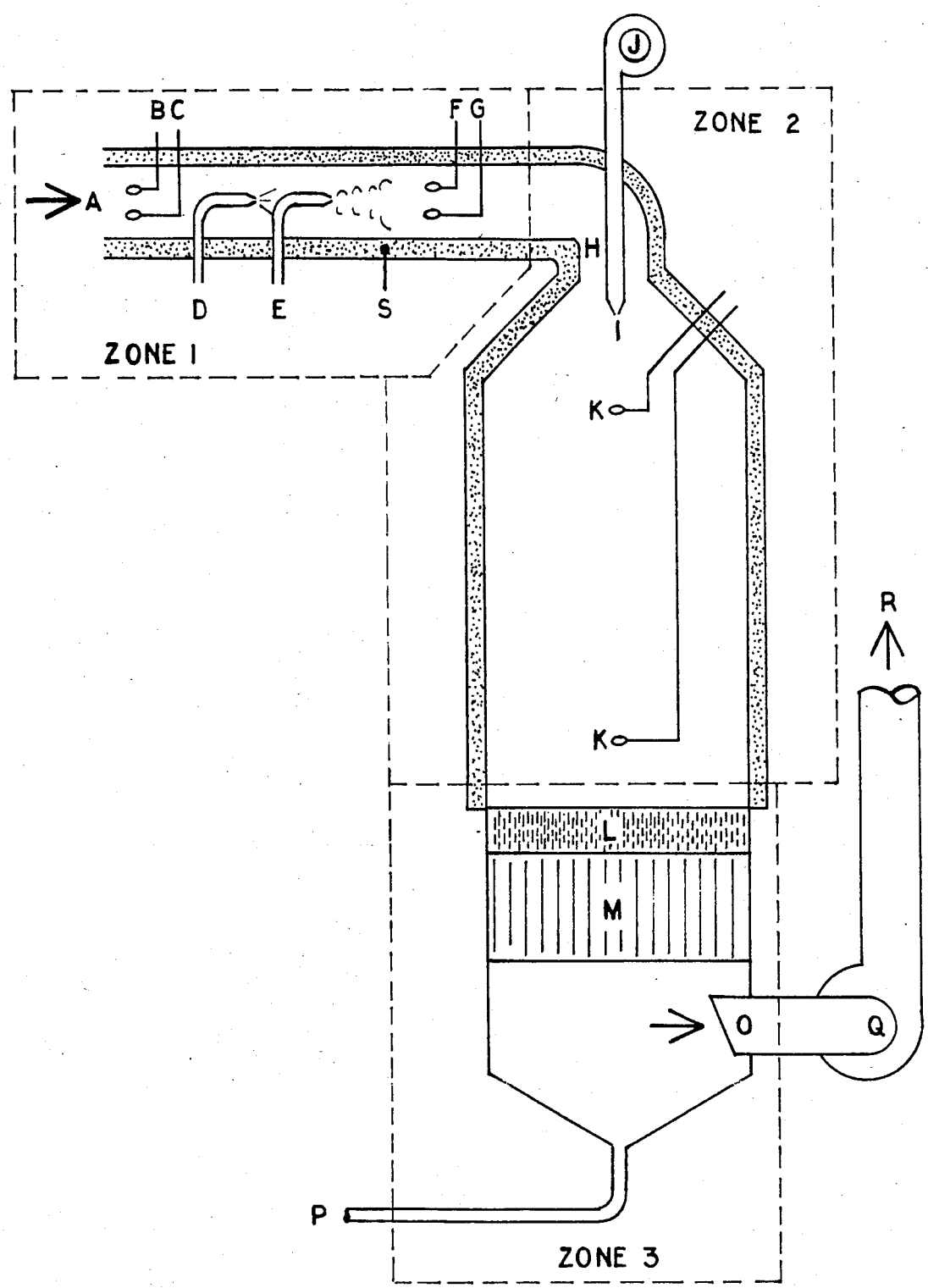

NUCLEATION SEPARATOR FOR FLUE GAS

FIELD OF THE INVENTION

This invention pertains to the removal of contaminants from the flue gas of combustion systems. A popular use of this invention would be for air pollution control where the stack emissions of smoke and sulfur dioxide from power plants could be significantly reduced.

BACKGROUND OF THE INVENTION

The prior art of U.S. Pat. Nos. 4,049,399; 4,337,2239 and 4,401,444 each use the nucleation of submicron contaminant particles from water vapor and the subsequent collection of these nucleated droplets as a means of cleaning flue gas. These prior art processes are restricted to (1) a turbulent isoenthalphic means of nucleation and (2) an isothermal venturi process which causes nucleation. Each of these methods apply specifically to submicron particles and embody a transitory phase where the probability of revaporization of the nuclei prior to separation from the flue gas is very high.

The obvious shortcomings of these processes are: (1) Much of the nucleation which may occur reverses into evaporation before the contaminant droplets can be collected. (2) Neither method specifically defines a means of promoting the accretion of these droplets into the larger drops required for an effective collection process. (3) Neither process effectively operates on particles of greater than 1 micron in size. (4) Neither process attains separation efficiencies approaching current best available control technology.

This invention specifically addresses these shortcomings where an extended state of supersaturation is attained, allowing for complete nucleation on all contaminant particles and for the accretion into the larger droplets required for inertial collection.

A paper presented by C.C Shale in Aug. 29-30, 1972 at the 164th Meeting of the American Chemical Society, titled: *Ammonia Injection: A Route to Clean Stacks*, describes *nucleation* as, "The apparent cause for such effective removal of the finely divided salt particles ($d_p=0.01$ to $1.0$ $\mu$m) and the residual ash particles . . ." The paper did not describe specific apparatus or methods which cause nucleation, but does state (Table II) that 100% removal of $SO_2$ did occur. This represents the most outstanding example of the references cited that the process of nucleation, if applied correctly, is a truly effective means of flue gas cleanup.

BRIEF SUMMARY OF THE INVENTION

The object of this invention is to provide an improved means of removing contaminants from the flue gas of combustion processes through the use of nucleation. Prior art processes do not specifically define a state of continuous supersaturation or a means of promoting the accretion of nucleated water droplets into the larger drops required for an effective collection process.

The novel features of this improvement process take place in three zones. They include:

(Zone 1) A combination of water and steam which are added to flue gas such that a predetermined dew-point temperature is reached without condensation occurring. This enables a precise control of the water content, allowing the nucleation process to accommodate variable quantities of contaminant mixtures.

(Zone 2) A nucleation chamber consisting of cold gas mixing apparatus. The saturated flue gas within the chamber is mixed with cold gas, preferably atmospheric air, which lowers the chamber temperature below the dew-point temperature of the flue gas such that the gas becomes supersaturated. The water vapor then tends to seek a lower state of energy by releasing its heat of vaporization to surrounding surfaces. Consequently all particles and molecules which can absorb this heat and still remain below the dew point will serve as seed nuclei for condensation. The entire chamber is kept in a state of supersaturation, allowing the droplets to continuously grow rather than evaporate.

(Zone 3) The flue gas and nucleated particles pass through a cold heat exchanger. This heat exchanger condenses most of the remaining water vapor which lowers the nucleation chamber pressure of zone 2. This lower pressure drives the temperature of zone 2 further below the dew point, causing the condensation process to accelerate. At the same time in zone 3, the velocity of the flue gas containing the nucleated droplets is increased to a Reynolds number sufficiently high enough for turbulent flow. The resulting collisions of the droplets promote accretion into larger droplets. Maze type apparatus such as demister screens, then provide complex pathways through which the larger droplets collide with and collect on the walls of the maze. The resulting collection of water which contains the contaminant particles, runs off, totally separating those particles from the flue gas.

BRIEF DESCRIPTION OF THE DRAWING

The drawing consists of three zones.

Zone 1, Dew Point Chamber: Where hot flue gas is mixed with water and steam to produce a state of saturation.

Zone 2, Nucleation Chamber: Where the saturated flue gas from zone 1 is cooled to a state of supersaturation, causing nucleation to take place on the contaminant particles.

Zone 3, Accretion and Collection Chamber: Where the nucleated droplets are inertially separated from the flue gas.

DETAILED DESCRIPTION

The invention consists of three zones, the first two zones are insulated by a suitable material S such as fiberglass, a material well known in the art of insulation. Hot flue gas, preferably above 300° F., enters zone 1 at A, Particle sensor B, one of the several fabricated or commercial models known in the art, measures the quantity of contaminant particles such as fly ash, sulphur oxides, nitrogen oxides and volatile metals. Flow rate sensor C measures the flow rate of the flue gas. Together sensors B and C, or their equivalent, through the appropriate circuitry as would be known to those skilled in the art of flow rate measurement, would indicate the relative proportion of the contaminant flow rate to the flue gas flow rate. This measured information is used to automatically calculate through one of the popular microprocessor circuits available or through other means known in the art, the quantity of water vapor required to nucleate, as described below, each contaminant particle in the flue gas flow. The greater the quantity of contaminant particles, the greater the quantityof water vapor required. This measured proportion of water vapor to flue gas, in a non-condensing state, determines the dew-point temperature. It is critical in this invention, that the flue gas temperature is set to this dew point in zone 1 at a state of saturation without condensation occurring, the reason being obvious from further explanations below. Wet bulb sensor F and dry bulb sensor G, or equivalent humidity sensors known to those skilled in the art, measure this dew-point temperature, and in conjunction with sensors B and C through said microprocessor means, determine the quantity of water and/or steam to be injected into zone 1 at D and E respectively. It is to be noted that as water is injected into the flue gas stream at D that it immediately turns into vapor, cooling the flue gas by absorbing the latent heat of vaporization. If the quantity of water added tends to lower the flue gas temperature below the desired dew point, heat is provided which may be in the form of steam, injected at E. If steam is added it simultaneously increases the flue gas temperature and the quantity of water vapor, until the desired dew-point temperature is reached. If other forms of heat are added, additional water is added to achieve the desired dew point.

The saturated flue gas enters zone 2 at H, into the nucleation chamber. As the flue gas enters, it is mixed with cold gas, preferably atmospheric air, at nozzle I, forced in from blower J. The cold gas lowers the temperature below the dew point, causing a state of supersaturation and a resulting condensation on the flue gas contaminant particles; a process known as nucleation. Optical or other sensors K, known in the art, observe or measure the cloud formation of these nucleated droplets and regulate the flow of cold gas from I by electronic or other means known in the art such that a continuous state of supersaturation is maintained throughout zone 2.

The flue gas and water droplet mist flow into zone 3 through a gas to liquid cold heat exchanger L. This heat exchanger condenses out most of the remaining water vapor, significantly reducing its partial pressure which, because its adjacency to zone 2 has the effect of lowering the nucleation chamber pressure of zone 2. This lower pressure adiabatically drives the temperature of zone 2 further below the dew point, assisting the said state of supersaturation to persist.

At the same time in zone 3, forced draft fan Q pulls the flue gas mixture through heat exchanger L and the maze M, consisting of such apparatus commonly known in the field as demister screens, at a velocity high enough for turbulent flow. Turbulent flow promotes collisions between the water droplets. The resulting collisions between these droplets promote agglomeration into larger droplets. The complex pathways of heat exchanger L and Maze M trap the larger droplets which are limited by their greater angular momentum. This is because the larger droplets cannot follow the maze paths and subsequently collide with and collect on the walls of L and M. The resulting liquid water runs off to the bottom and out of zone 3 at P, taking with it the original flue contaminants. The clean flue gas flows out of zone 3 at O, through the blower Q and exits at R.

I claim:

1. A process for removing particulate compounds and hygroscopic compounds and elements all of which are known herein as contaminants, from combustion flue gas, comprising the steps of:
   (a) treating said flue gas with water until a state of saturation is reached;
   (b) passing said saturated flue gas into a chamber called herein a nucleation chamber, where cold gas or atmospheric air cools said saturated flue gas below its dew point, causing a state of supersaturation throughout said chamber and a subsequent condensation on said contaminants where contaminant particles serve as condensation nuclei, termed herein as nucleation, and a subsequent growth and accretion of resulting water droplets to droplets of larger size;
   (c) passing and cooling said flue and droplets through a heat exchanger such as a common gas to liquid type, wherein because addition water vapor is condensed, the partial pressure of said nucleation chamber is lowered which adiabatically lowers the temperature of said chamber further below the dew point, thus assisting a state of supersaturation through said nucleation chamber and passing said flue gas and water droplets through a maze apparatus at turbulent velocities where resulting mutual collisions of water droplets cause said droplets to agglomerate into larger droplets, which, due to their greater angular momentum, are unable to follow said maze paths and collide with said maze walls, and are collected.

2. The process of claim 1 wherein step (a) comprises treating said flue gas with steam and water until a dew point is established which sets a predetermined ratio of water vapor to contaminant volume.

3. The process of claim 1 wherein the placement of a forced draft fan at any location within said flue gas stream after said nucleation chamber which effects lowering the pressure of said nucleation chamber which adiabatically lowers temperature of said chamber below said dew point, thus assisting a state of supersaturation throughout said nucleation chamber.

4. The process of claim 1 where contaminants need not be hygroscopic as is the convention with nucleation systems, but where said contaminants are not necessarily hygroscopic and absorb the heat of vaporization from said saturated flue gas and still remain below the dew point, thus causing a state of condensation on said contaminant particles regardless of contaminant physical size or affinity for water.

* * * * *